(12) United States Patent
Sprung

(10) Patent No.: US 8,967,084 B2
(45) Date of Patent: Mar. 3, 2015

(54) MOTORLESS REACTOR FOR MARINE AQUARIUMS

(76) Inventor: Julian Sprung, Miami Beach, FL (US)

( * ) Notice: Subject to any disclaimer, the term of this patent is extended or adjusted under 35 U.S.C. 154(b) by 423 days.

(21) Appl. No.: 13/578,807

(22) PCT Filed: Feb. 14, 2011

(86) PCT No.: PCT/US2011/024712
§ 371 (c)(1),
(2), (4) Date: Aug. 13, 2012

(87) PCT Pub. No.: WO2011/100662
PCT Pub. Date: Aug. 18, 2011

(65) Prior Publication Data
US 2012/0312244 A1  Dec. 13, 2012

Related U.S. Application Data

(60) Provisional application No. 61/304,096, filed on Feb. 12, 2010.

(51) Int. Cl.
*A01K 63/04* (2006.01)
(52) U.S. Cl.
USPC ..................................... 119/268; 210/167.21
(58) Field of Classification Search
USPC ......... 119/215, 260, 261, 268, 255, 264, 204, 119/200; 210/167.11, 167.21, 167.23, 210/167.3, 170.02, 416.2
See application file for complete search history.

(56) References Cited

U.S. PATENT DOCUMENTS

| 4,274,970 | A | * | 6/1981 | Beitzel ..................... 210/748.12 |
| 4,676,438 | A | * | 6/1987 | Sesser ........................... 239/722 |
| 5,178,758 | A | * | 1/1993 | Hwang ......................... 210/256 |
| 5,333,796 | A |   | 8/1994 | Purtell et al. |
| 5,640,929 | A | * | 6/1997 | Malone ......................... 119/248 |
| 5,705,057 | A | * | 1/1998 | Hoffa ........................... 210/150 |
| 5,879,567 | A | * | 3/1999 | Robertson .................... 210/786 |
| 5,910,248 | A | * | 6/1999 | Tlok ............................. 210/608 |
| 6,086,760 | A |   | 7/2000 | Hoffa |
| 6,143,187 | A | * | 11/2000 | Robertson .................... 210/786 |
| 6,357,177 | B1 |   | 3/2002 | Hirose |
| 6,474,265 | B1 |   | 11/2002 | Powell |
| 7,169,311 | B2 | * | 1/2007 | Saccomanno .............. 210/198.1 |
| 8,033,252 | B2 | * | 10/2011 | Allis ............................ 119/261 |
| 2009/0218265 | A1 | | 9/2009 | Dor |
| 2012/0137492 | A1 | * | 6/2012 | Kossik ........................... 29/428 |
| 2014/0231325 | A1 | * | 8/2014 | Yim ......................... 210/167.23 |

* cited by examiner

*Primary Examiner* — Yvonne Abbott
(74) *Attorney, Agent, or Firm* — Venable LLP; Steven J. Schwarz

(57) ABSTRACT

A motorless reactor may include a base member, a tubular container, an inlet and an outlet, a pipe, and a head member. The tubular container may define a longitudinal axis extending between an upper end and a lower end, the lower end of the tubular container being coupled to the base member. The inlet and the outlet may be disposed proximate the upper end of the tubular container. The inlet may be configured to receive a pressurized flow of water from a reservoir, and the outlet may be configured to output a mixture of water and a predetermined substance. The pipe may be coupled to the inlet and may extend substantially parallel to the longitudinal axis from a first end proximate the upper end of the tubular container toward a second end proximate the base member.

20 Claims, 9 Drawing Sheets

US 8,967,084 B2

MOTORLESS REACTOR FOR MARINE AQUARIUMS

CROSS-REFERENCE TO RELATED APPLICATIONS

This application claims priority to U.S. Provisional Application No. 61/304,096 filed Feb. 12, 2010, the entire contents of which are hereby incorporated by reference.

BACKGROUND

1. Field of Invention

The invention is related to a device for mixing and supplying solutions or live food cultures in aquariums such as, for example, reef aquariums and other aquariums. More particularly, the invention is related to a motorless reactor for an aquarium system to automate the process of replenishing calcium and alkalinity, pH maintenance, and/or live food culture and delivery.

2. Related Art

In nature, the limitless supply of seawater that bathes coral reefs provides the minerals utilized by reef creatures to build their skeletons. Hard corals, coralline algae, and other calcifying algae and invertebrates, which are the building blocks of the coral reef, demand large amounts of calcium and carbonates to build their skeletons.

In reef aquariums that are designed to grow live corals in a closed body of recirculating seawater, the addition of dissolved calcium and carbonates is essential to accommodate the needs of the calcifying corals, other invertebrates, and algae that build calcareous skeletons, shells, and cementing crusts from the calcium and bicarbonate ions they extract from the alkaline seawater solution they live in. It is common practice to daily replace evaporated water by topping off the aquarium with a solution of freshly mixed calcium hydroxide in freshwater, because it is a source of calcium, and because it boosts carbonate alkalinity since the addition of the highly alkaline solution of calcium hydroxide causes additional carbon dioxide to dissolve in the aquarium water. The solution of calcium hydroxide in freshwater is known as "limewater," but most commonly referred to with the German translation, "kalkwasser."

Many systems for dosing kalkwasser exist (See Delbeek & Sprung, *The Reef Aquarium*, Vol. 3, 2005, incorporated herein by reference), but the most efficient methods utilize a chamber called a reactor where the calcium hydroxide powder is mixed with freshwater prior to being added to the aquarium. Aquarists can accomplish this manually by putting the calcium hydroxide into a small jug of water and shaking it, allowing the un-dissolved calcium hydroxide to settle and decanting or drip-feeding the saturated clear solution to the aquarium. The advantage of using a reactor is that a saturated solution can be created automatically for several days, involving less work by the aquarist. Excess calcium hydroxide is added to the reactor, and it sinks to the bottom because it has a low solubility. A stirring device mixes it with water in the reactor, creating a solution that is saturated or supersaturated. Pure freshwater used as top-off water for the aquarium is added by a dosing pump to the reactor, and the saturated solution overflows from the reactor, being conducted by gravity into the aquarium. The mixing is usually done at timed intervals, allowing the un-dissolved calcium hydroxide powder to settle so that only clear saturated kalkwasser is dosed to the aquarium. It is also possible to dose milky, unsettled kalkwasser, but this is potentially risky as the chance of overdose is higher. If the water feed passes through the un-dissolved calcium hydroxide from the bottom of the reactor upward, a gentle mixing can be achieved that creates saturated kalkwasser without the need for timed settling.

Previous reactors generally have a high cost due to additional motors and/or motorized parts required for mixing that are prone to failure and need regular maintenance. In designs where the motors or pumps are directly exposed to limewater, extra careful maintenance is required to remove the deposits of calcium carbonate that rapidly form on the magnetized and moving parts.

SUMMARY

In an embodiment of the invention, a motorless reactor is provided. The reactor may include a base member, a tubular container, an inlet and an outlet, a pipe, and a head member. The tubular container may define a longitudinal axis extending between an upper end and a lower end, the lower end of the tubular container being coupled to the base member. The inlet and the outlet may be disposed proximate the upper end of the tubular container. The inlet may be configured to receive a pressurized flow of water from a reservoir, and the outlet may be configured to output a mixture of water and a predetermined substance. The pipe may be coupled to the inlet and may extend substantially parallel to the longitudinal axis from a first end proximate the upper end of the tubular container toward a second end proximate the base member. The head member may be coupled to an end of the pipe proximate the base member and may be configured to direct the pressurized flow of water and thereby mix the water and predetermined substance disposed proximate the base member.

Further features and advantages of the invention, as well as the structure and operation of various embodiments of the invention, are described in detail below with reference to the accompanying drawings.

BRIEF DESCRIPTION OF THE DRAWING FIGURES

The foregoing and other features and advantages of the invention will be apparent from the following, more particular description of some example embodiments of the invention, as illustrated in the accompanying drawings. Unless otherwise indicated, the accompanying drawing figures are not to scale. Several embodiments of the invention will be described with respect to the following drawings, in which like reference numerals represent like features throughout the figures, and in which.

Figure 8:
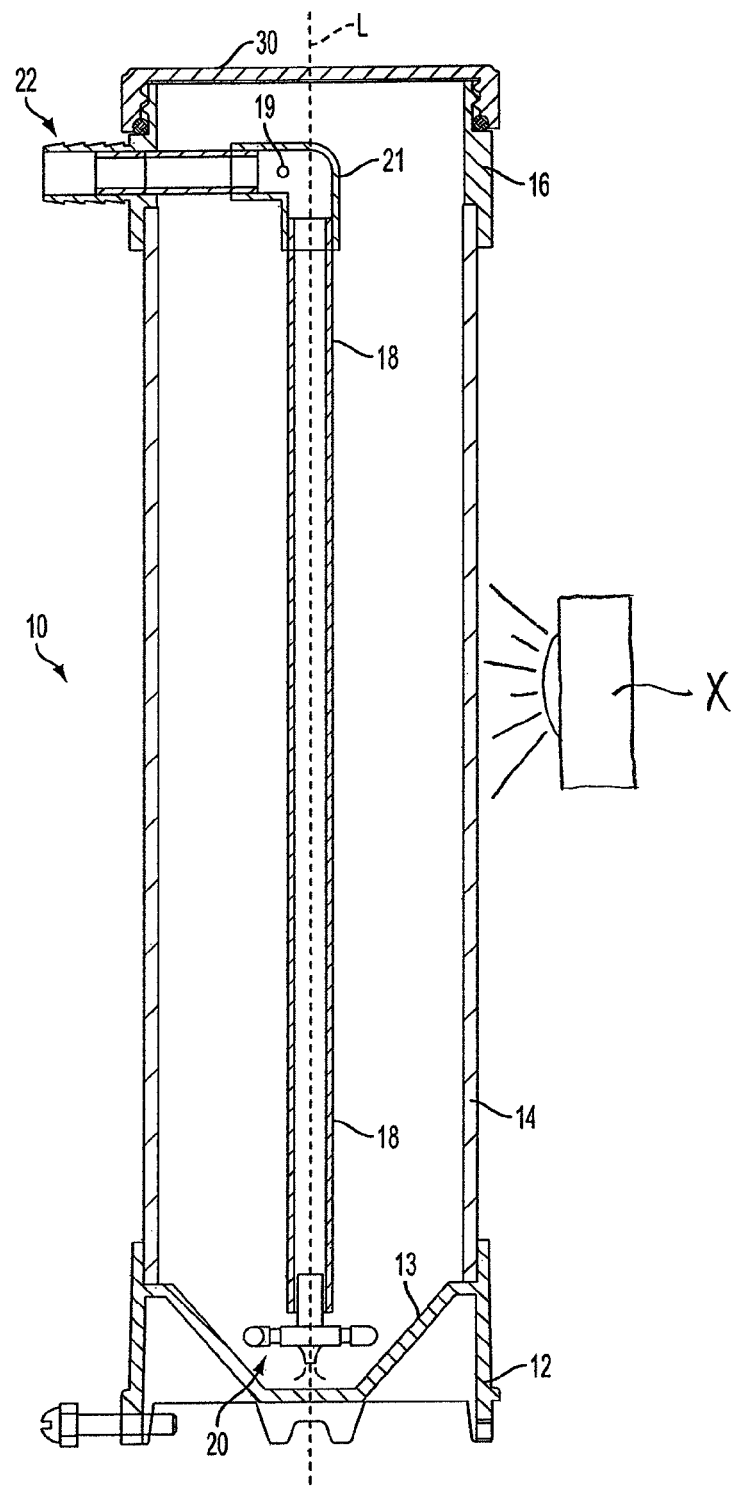
Figure 9:
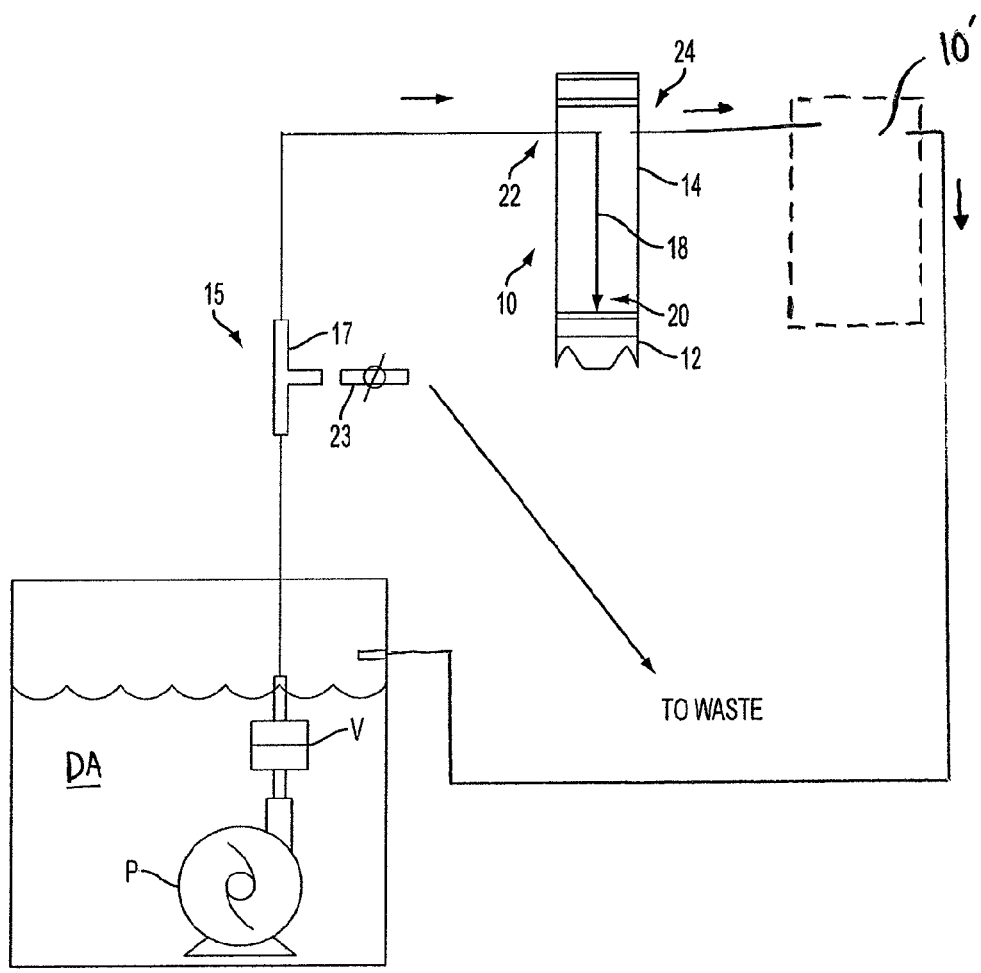

FIG. 8. depicts a cross-sectional side view of a motorless reactor illuminated by a light source according to an embodiment of the invention; and FIG. 9 depicts a schematic view of a motorless reactor coupled to a container according to an embodiment of the invention.

DETAILED DESCRIPTION

Various embodiments of the invention are discussed in detail below. While specific embodiments are discussed, specific terminology is employed for the sake of clarity. However, the invention is not intended to be limited to the specific terminology so selected and it should be understood that this is done for illustration purposes only. A person skilled in the relevant art will recognize that other components and configurations can be used without parting from the spirit and scope of the invention. Each specific element includes all technical equivalents that operate in a similar manner to accomplish a similar purpose.

Figure 1:
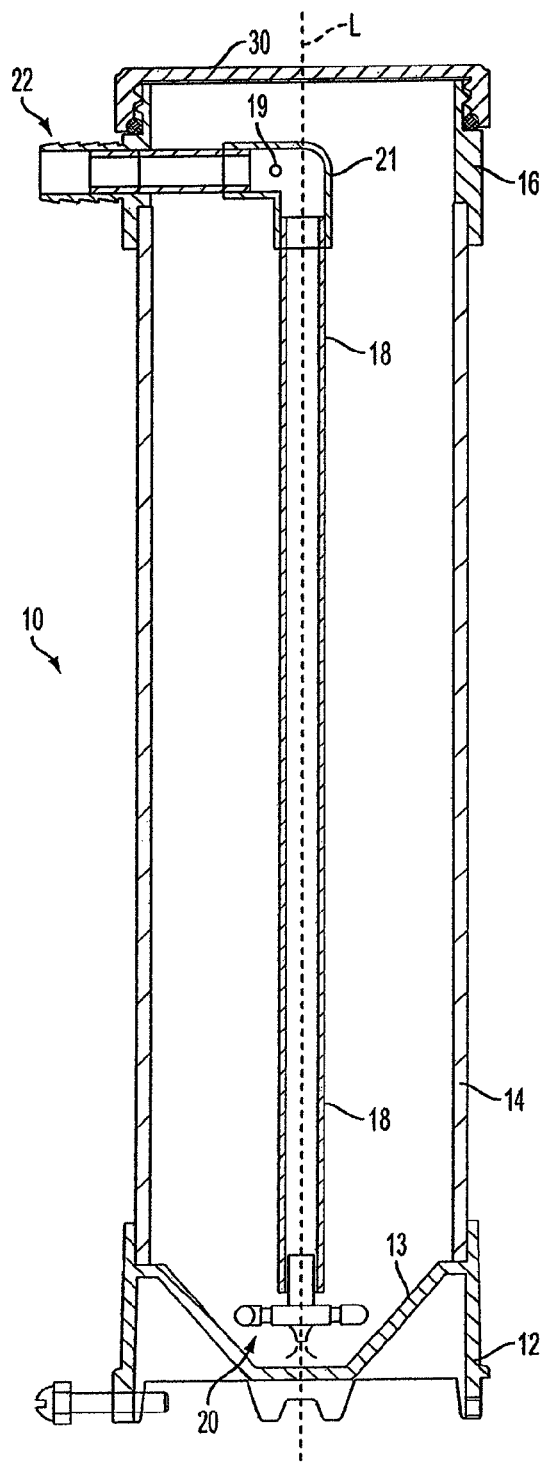
FIG. 1 depicts a cross-sectional side view of a motorless reactor according to an embodiment of the invention.

FIG. 1 depicts a cross-sectional side view of a motorless reactor 10 according to an embodiment of the invention. The reactor 10 may include a base member 12, a tubular container 14, a top member 16, a pipe 18, and a head member 20 which may or may not be pivotable. The base member 12 may be capable of supporting the reactor 10 in a standing configuration and may also define an inner conical surface 13. The tubular container 14 may define a longitudinal axis A extending between an upper end and a lower end, the lower end of the tubular container 14 being coupled to the base member 12. While the tubular container 14 depicted in FIG. 1 has a circular cross-section, one of ordinary skill in the art will recognize that any other cross-sectional shape may be utilized. The top member 16 may be removably coupled to the upper end of the tubular container 14 and may comprise an inlet 22 and an outlet 24 (see FIGS. 2-3). The inlet 22 may be configured to receive a pressurized flow of water, either pumped or drained, from a reservoir R (see FIG. 1a) and the outlet 24 may be configured to output a mixture of water and a predetermined substance, discussed in further detail below. The pipe 18 may be coupled to the inlet 22 and may extend substantially along or parallel to the longitudinal axis A from a first end proximate the top member 16 toward a second end proximate the base member 12. The pipe 18 may be of a smaller diameter than the water feed inlet 22 so that the pressure is increased and the flow rate is reduced. The head member 20 may be coupled to an end of the pipe 18 proximate the base member 12 and may be configured to direct the pressurized flow of water and thereby mix the water and predetermined substance disposed proximate the base member 12.

In an embodiment, the predetermined substance may be, for example but not limited to, calcium hydroxide. Where the predetermined substance is calcium hydroxide, the pressurized water operates to mix un-dissolved calcium hydroxide powder disposed on the base member 12. Alternatively, or additionally, the predetermined substance may include, for example but not limited to, lye (sodium hydroxide), an acid, a base, a buffer, or any other pH influencing substance, and combinations thereof. Alternatively, or additionally, the predetermined substance may include, for example but not limited to, a live food culture such as, for example, a culture of live microalgae. For simplicity in describing the features of the reactor, an embodiment utilizing the reactor to mix and supply a saturated or supersaturated calcium hydroxide solution ("kalkwasser") is discussed in further detail below.

Figure 1A:
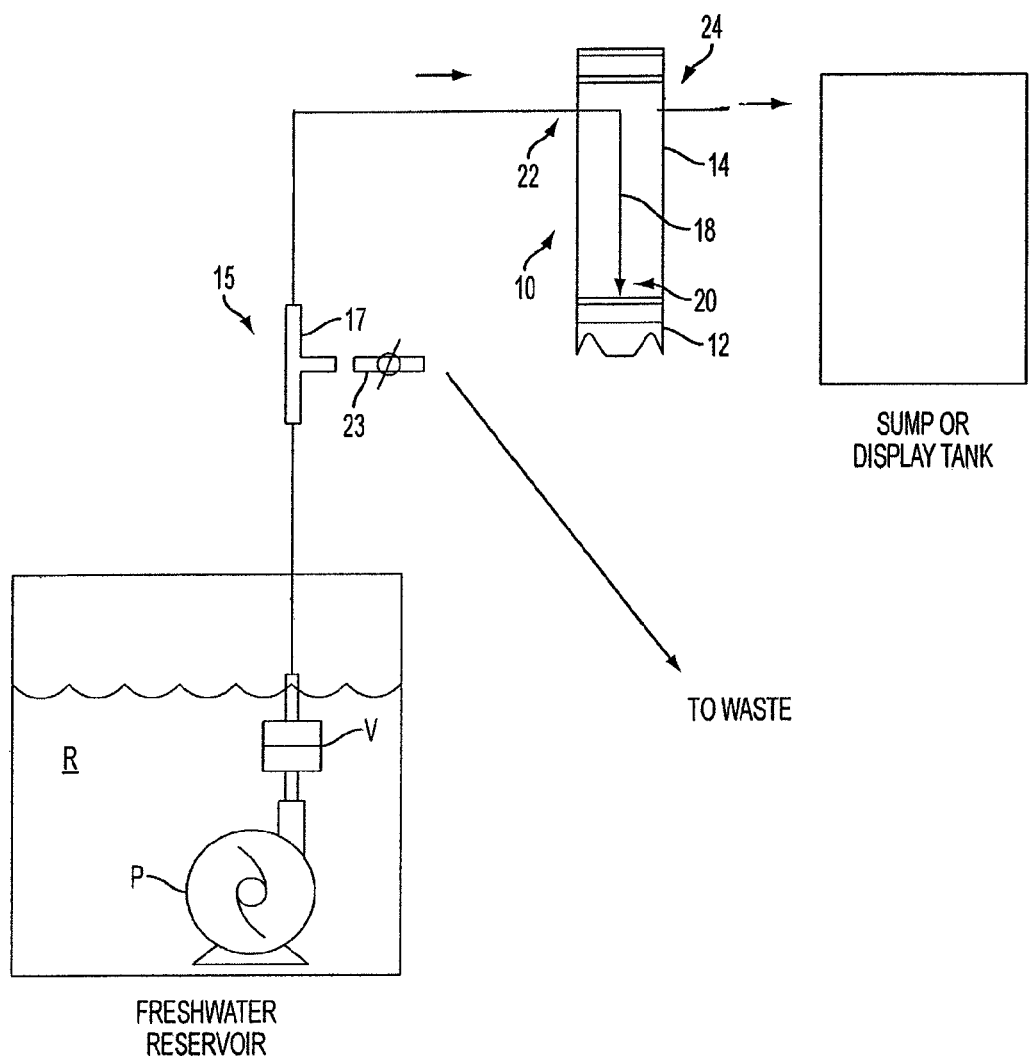
FIG. 1a depicts a schematic view of the reactor of FIG. 1 coupled to a reservoir and optionally including a configuration to drain solids from the bottom of the reactor.

Referring to FIG. 1a, in order to prevent backflow of the kalkwasser through pipe 18 toward the pump P and reservoir R, a check valve V may be disposed at a point between the pump P and the head member 20. For example, the check valve V may be located in the line connecting the pump P to inlet 22 of the reactor 10. The check valve V may be any standard check valve such as, for example, but not limited to an appropriately sized king spring check valve made by KBI Company of Valencia, Calif. Alternatively, or concurrently, the pipe 18 could include an opening 19 (see FIG. 1) near an upper end thereof to allow air to enter the pipe 18 and thereby break the siphon and prevent backflow, but in so doing a volume of air would be retained within the pipe after each feed cycle, and this air would need to be purged through the reactor 10. The opening 19 may, for example, be disposed on an elbow connector 21 of the center pipe 18. The pipe 18 is positioned in the center of tubular container 14 but may be free to move within the tubular container 14.

Optionally, as shown in FIG. 1a, there may also be a drain 15 including, for example, a T-fitting 17 and a ball valve 23 which is normally maintained closed during operation of the reactor 10, but which may be manually opened to allow water in the line and reactor 10 to backflow, thus siphoning water and solids from the bottom of the reactor 10. In this way, water and solids can be drained from the reactor 10 and directed as waste to the atmosphere, e.g., to a waste bucket.

Figure 2:
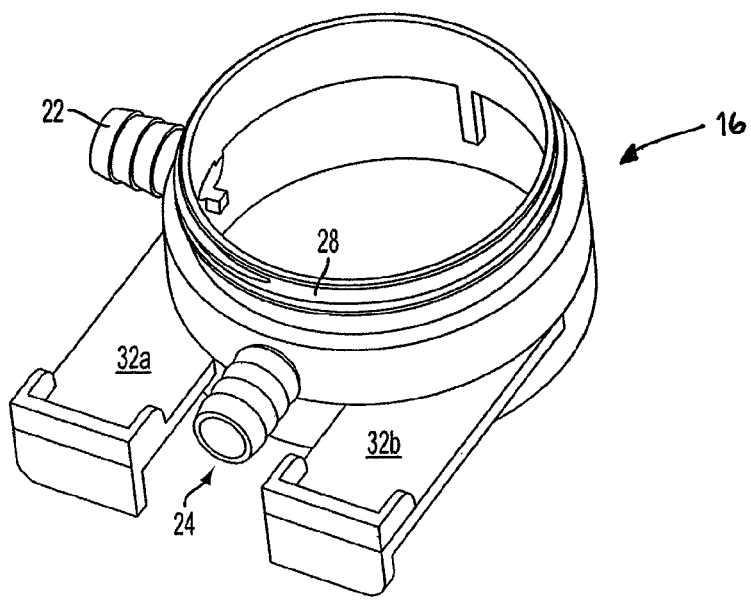
FIG. 2 depicts a perspective view of a top member of the motorless reactor of FIG. 1.
Figure 3:
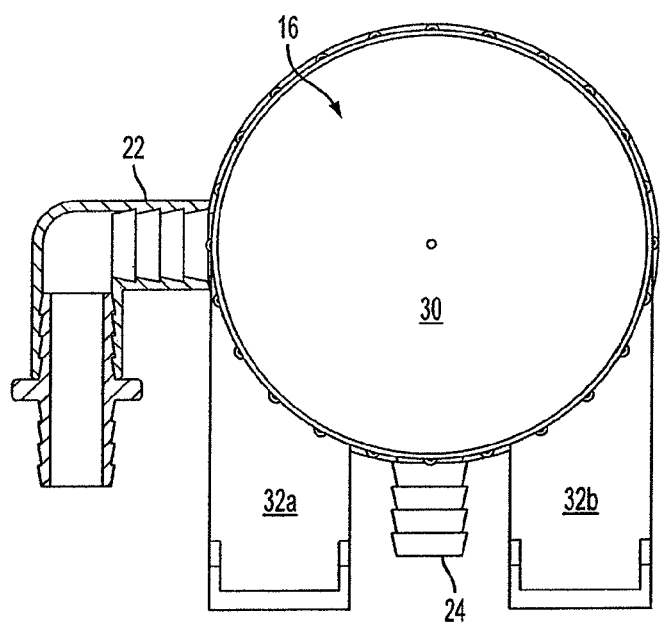
FIG. 3 depicts a top view of the top member of FIG. 2 including a threaded cap member.

FIG. 2 depicts a perspective view of the top member 16 of the motorless reactor 10 of FIG. 1 including inlet 22 and outlet 24 as well as a threaded portion 28 for receiving a cap 30. The top member may also include hanger attachments 32a, 32b for attaching the reactor 10 to an edge of the aquarium or an edge of a sump connected to the aquarium. FIG. 3 depicts a top view of the top member 16 of FIG. 2 including the threaded cap member 30. Although inlet 22 and outlet 24 are depicted in the drawings as being oriented approximately 90 degrees from one another on the top member 16, other configurations are possible such as, for example, both the inlet 22 and the outlet 24 may be disposed adjacent to one another on the same side or at 180 degrees from one another.

Figure 4:
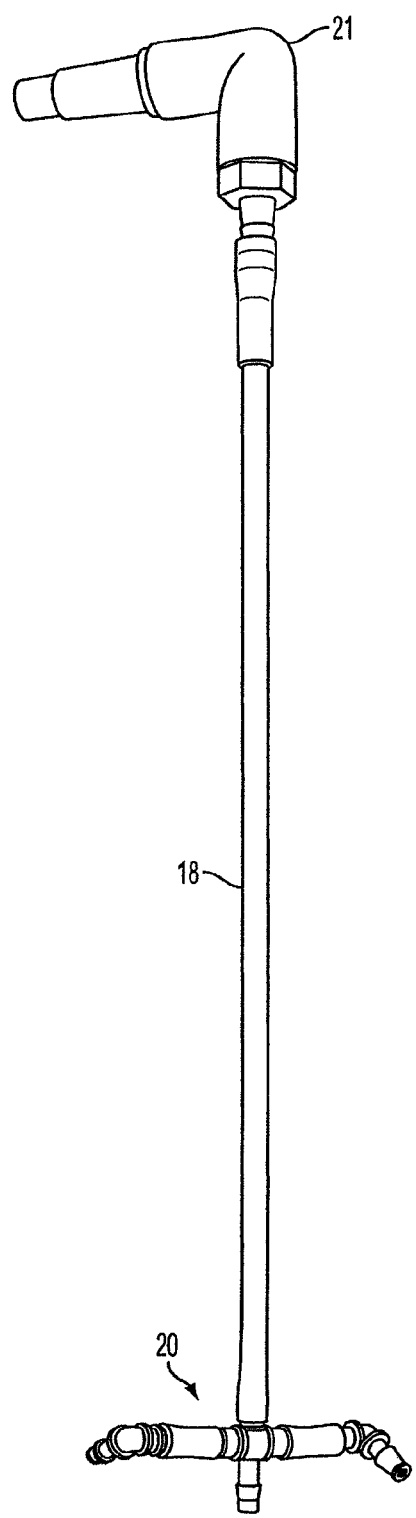
FIG. 4 depicts a side view of a center pipe of the motorless reactor of FIG. 1 including a non-pivotable head member according to an embodiment of the invention.
Figure 5:
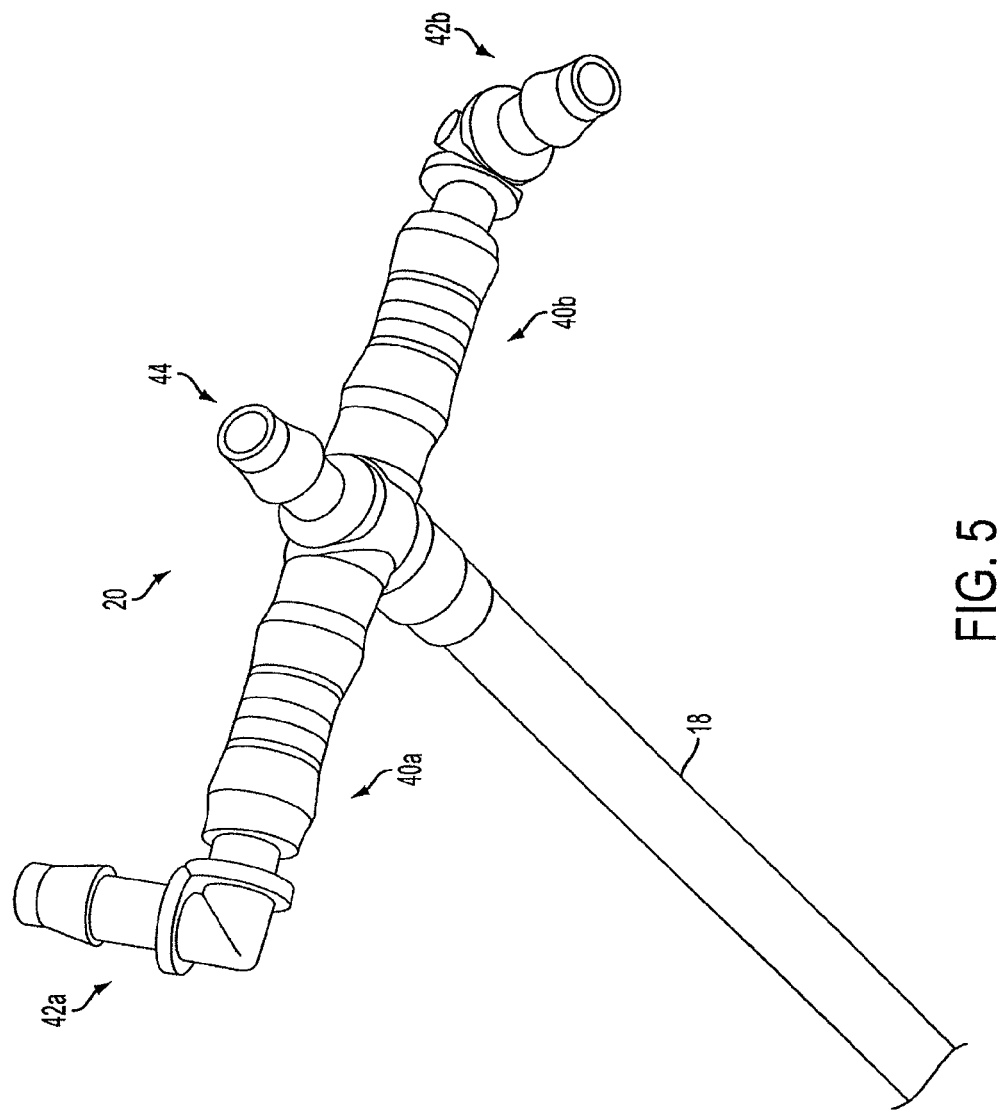
FIG. 5 depicts a bottom perspective view of the head member of FIG. 4.
Figure 6:
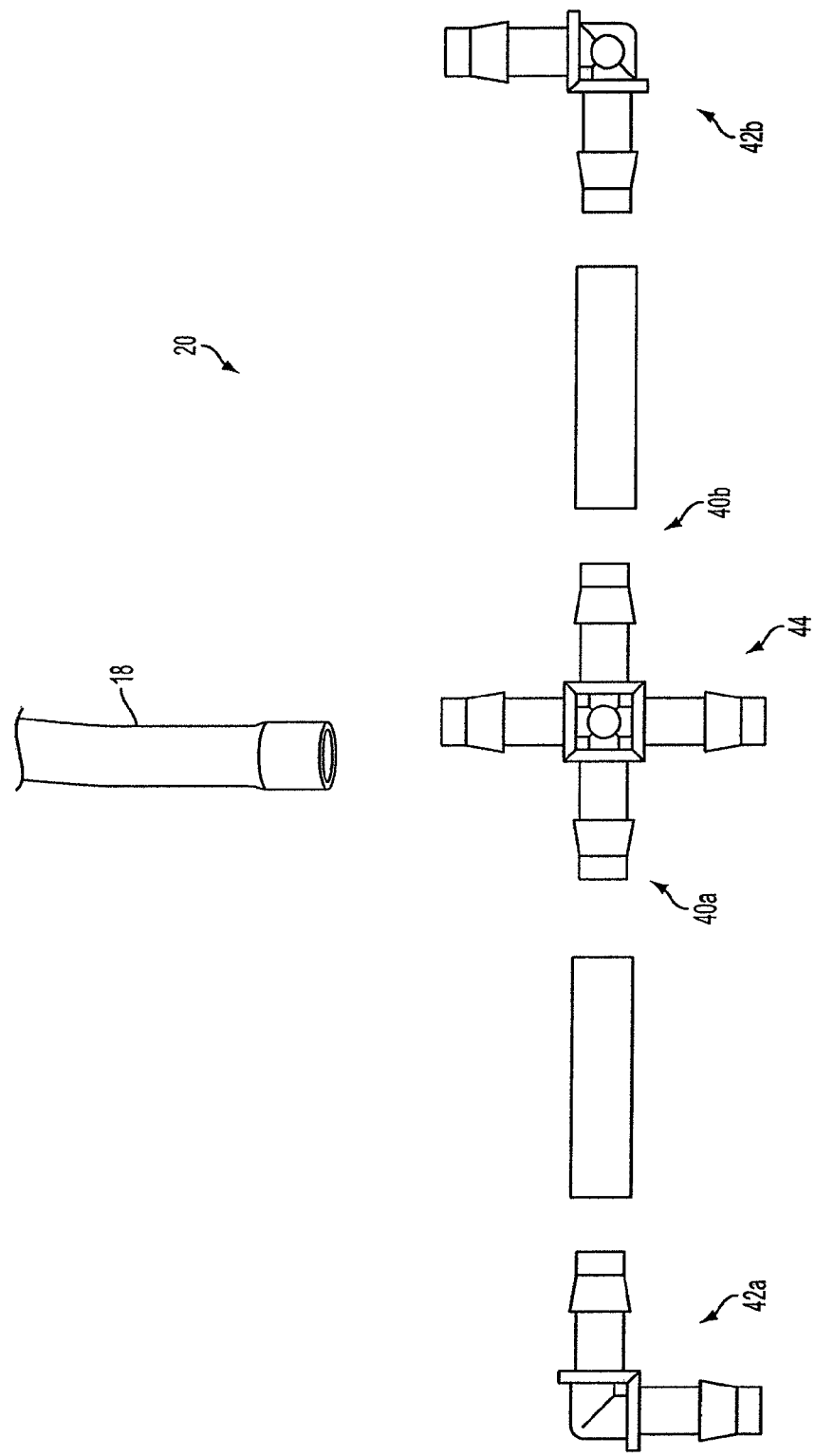
FIG. 6 depicts an exploded detail view of the head member of FIGS. 4 and 5.

FIG. 4 depicts a side view of the center pipe 18 of the motorless reactor 10 of FIG. 1 including a non-pivotable head member 20 according to an embodiment of the invention. FIG. 5 depicts a bottom perspective view of the non-pivotable head member 20 of FIG. 4. The non-pivotable head member may include one or more radially-extending fluid conducting arms 40a, 40b, each of which may include an L-shaped outlet portion 42a, 42b to achieve a circulating water flow with limited (or zero) dead spots. The non-pivotable head member 20 may also include an axial outlet portion 44 configured to direct water along the longitudinal axis L toward a bottom surface of the base member 12. If desired, the non-pivotable head member 20 could also include at least two additional radially-extending fluid conducting arms (not shown) each including a radially-directed outlet opening or an L-shaped outlet portion. FIG. 6 depicts an exploded detail view of the non-pivotable head member 20 of FIG. 4. The head member 20 may also be made to be pivotable, for example, by incorporating a low-friction bushing system.

Figure 7:
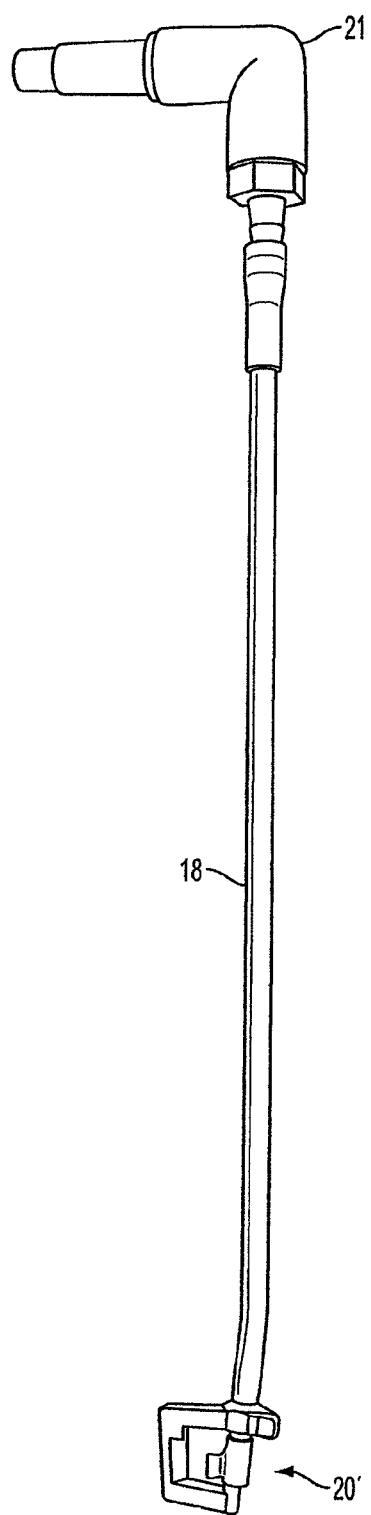
FIG. 7 depicts a side view of a center pipe of the motorless reactor of FIG. 1 including a pivotable head member in the form of an inverted sprinkler head according to another embodiment of the invention.

FIG. 7 depicts a side view of the center pipe 18 of the motorless reactor 10 of FIG. 1 including a pivotable head member 20' in the form of an inverted sprinkler head according to another embodiment of the invention. The inverted sprinkler head 20' may be, for example, an inverted rotor spray or mini sprinkler head with C-frame assembly such as those manufactured by Antelco® Corporation of Australia, with USA distribution located in Longwood, Fla. The pressurized outflow of water from the pivotable head member 20' may cause the center pipe 18 to rock back and forth, providing additional stirring above what might otherwise be achieved by simple rotation of the head member 20' due to the pressurized water stream.

As depicted in the embodiment shown in FIG. 1*a*, the reactor 10 may be used in combination with a freshwater reservoir R, a water feed pump P, and either a timer or a level-sensing switch (not shown). The water feed pump P may be an inexpensive centrifugal pump commonly called a "powerhead" in the aquarium industry. The pump may be located in the freshwater reservoir and may be connected by means of, for example, ½ inch ID hose to the inlet 22 of reactor 10. The check valve V may be placed between the pump P and reactor 10 to prevent backflow of water from the reactor to the reservoir R, which would contaminate the pump P with calcium and plug up the outlet of the head member 20. The timer or level sensing switch may turn on the pump P to replace water that has evaporated from the aquarium. The water pumped from the reservoir R enters the reactor 10 at inlet 22 and is conducted via center pipe 18 to the bottom where it enters the head member 20 that operates by the pressure of the water stream. As the freshwater exits the head member 20, it mixes with the predetermined substance such as, for example, calcium hydroxide disposed at the bottom (e.g., on a surface of the base member 12) of the reactor 10. The circular water flow generated by head member 20 and/or rotation of the head 20' mechanically mixes the un-dissolved calcium hydroxide powder. The small diameter of the pipe 18 increases the pressure and reduces the water flow simultaneously, improving the performance of the head member 20/20' while supplying an ideal flow rate so that the mixed calcium hydroxide powder rises only partially upwards, being limited by gravity, while the clear saturated kalkwasser continues to flow upward. The release of water from the spinning water outlet on the head 20' may move the entire head 20' and may also cause center pipe 18 to rock back and forth, providing an additional stirring feature. The input of water causes the level of water in the reactor 10 to rise, and clear saturated kalkwasser flows by gravity out of the outlet 24 at the top of the reactor 10. The outlet 24 may be connected to the sump of a wet/dry filter (not shown) of the aquarium or disposed such that the kalkwasser drips directly into the aquarium. The kalkwasser may be conducted by gravity to the aquarium or to the sump below the aquarium.

The aquarist may re-fill the water in the reservoir R as needed, for example once per week, depending on the evaporation rate of the aquarium. The aquarist may add more calcium hydroxide powder to the reactor 10 also about once per week. In the depicted embodiment, the inlet 22 and outlet 24 are located below the cap 30 to make it easy to remove the cap 30 for adding more calcium hydroxide. The inlet 22 could also be disposed on the cap 30, but adding calcium hydroxide would be more difficult then unless there was a second, smaller cap (not shown) that could be removed without interfering with the inlet and outlet. Reducing the contact of the kalkwasser with air prevents the formation of calcium carbonate within the reactor 10. Calcium carbonate forms as the calcium hydroxide comes in contact with dissolved $CO_2$. A buoyant plastic insert, cushion, or fitted sponge (not shown), could also be inserted under the cap 30 to minimize air contact. Such an insert would need to be removed when the calcium hydroxide is added and replaced afterwards before closing the cap 30. As an alternative, the insert could be attached or molded to the inside of the cap 30. In another embodiment, reservoir R may be a closed and sealed bag or soft, collapsible container containing freshwater and pump P. This sealed configuration may limit carbon dioxide supply to the reactor 10 because, as water is pumped out, the bag collapses and no air enters to contact the water. When all the water is pumped out, the bag may be replaced or it may be opened and re-filled, then the air pressed out and the bag closed.

The kalkwasser is mixed without separate motors by having a water-feed directed into the powder at the bottom of the reactor 10. In addition, the use of a non-pivotable head member 20 configured to generate a circular flow or a pivotable head member 20' (e.g., a sprinkler head) may provide mechanical mixing. A valve (not shown) on the water supply hose could be used to regulate the rate of water feed and the rate of mixing, but in the hobby scale model this arrangement isn't needed because the smaller diameter of the pipe 18 simultaneously regulates water feed and the rate of mixing. To a lesser extent, though still significant, the size of the output orifice of the head member 20/20' may regulate the water feed rate and the rate of mixing. The feed pump P processes pure freshwater only, so it is not exposed to the kalkwasser that can leave harmful deposits on the impeller. The check valve V maintains this separation of the pump P from the kalkwasser in reactor 10.

In another embodiment (not shown), a single outlet may be aimed at the bottom of the reactor 10. A strong, briefly pulsed water supply through center pipe 18 aimed at the bottom might achieve a mixing effect that eliminates dead spots, but it may also add complexity to the design. The reactor 10 could also include a purge valve (not shown) at the bottom to make it easy to empty the reactor or flush out the calcium hydroxide (or calcium carbonate) powder. An alternative to the purge valve may include the "T" fitting 17 positioned in line on the water feed, between the check valve V and the reactor 10 as shown in FIG. 1*a*. The ball valve 23 connected to the stem of the T 17 is normally maintained closed. A length of hose may be attached to the open end of the ball valve 23. To purge the reactor 10, the valve 23 can be opened, causing the water to back siphon from the bottom of the reactor 10, drawing out any un-dissolved calcium hydroxide. The purge hose can be used to conduct water to a waste bucket. The head member 20/20' could be removed for this purging operation, or, if left in place, it might need to be cleaned (soaking in vinegar) afterwards to prevent calcium carbonate from plugging up the small water orifice.

As previously noted, in some embodiments the reactor 10 may be utilized, for example, as part of a pH maintenance system or a live food culture and delivery system. Utilizing the same arrangement of parts described above, and connecting the pump P to a pH controller for switching (not shown), the reactor 10 could be utilized as part of a pH maintenance system. In an embodiment, the predetermined substance may be, for example but not limited to, limewater (calcium hydroxide), Lye (sodium hydroxide), or any other pH influencing substance (acid or base, or buffer). The water feed could be from a freshwater top-off reservoir R (see FIG. 1*a*), in which case it may be utilized to make up for evaporative losses in the pH-controlled system. Alternatively the pump P could be located within the pH-controlled system (e.g., in the aquarium—see, e.g., FIG. 9) whereby it pumps water from this system into the reactor 10, so that no evaporation top-off is achieved, but pH management is accomplished. An advantage of using reactor 10 is that a saturated solution of a pH influencing substance can be created by adding excess powder to the reactor 10. When the pump P is turned on the supply water is mixed with the powder and a clear saturated solution can be delivered via outlet 24 to the aquarium.

In another embodiment, instead of pH maintenance or calcium and alkalinity maintenance, the reactor 10 could be utilized to supply live microalgae to a display aquarium. In this arrangement, the predetermined substance may include, for example, a culture of microalgae, which can be added to the reactor 10. The reactor 10 as substantially described above can be illuminated by a light source X (see FIG. 8) such as, for example but not limited to, fluorescent tubes, LED lights, or any other suitable source of light. The feed pump P can supply water to the reactor 10 from a reservoir R (see FIG. 1a) containing sterile water of the same salinity as the reactor 10, with or without nutrients added, so that live microalgae flow out of outlet 24 of the reactor 10 when the feed pump P is turned on. The supply water promotes the growth of the microalgae by simultaneously adding essential nutrients and reducing the density of the culture (since it displaces the microalgae rich water with sterile water). In another embodiment, the arrangement could be done without a reservoir R, instead placing pump P in, and pumping water directly from, the display aquarium DA (see FIG. 9), so long as the water is filtered with very fine mechanical filtration and Ultraviolet sterilization (not shown). In such an arrangement, nutrient rich aquarium water supplies food for the microalgae without also supplying competing bacteria or animals that might eat the microalgae in the reactor 10, which could cause the culture to crash. The microalgae exiting the reactor 10 may be fed directly to a display aquarium DA or it may be directed into a second reactor 10' or aquarium (see FIG. 9) where zooplankton may be cultured. The zooplankton culture feeds on microalgae. The overflow of microalgae rich water from the first reactor 10 to the second causes zooplankton rich water to overflow into the attached aquarium. An advantage of using reactor 10 for phytoplankton culture is that it restricts the flow rate and it provides circulation and upflow of new water that helps suspend the microalgae. The reactor 10 itself may have a transparent body suitable for allowing proper illumination. For example, tubular container 14 may be composed of a clear plastic or glass material.

While various embodiments of the present invention have been described above, it should be understood that they have been presented by way of example only, and not limitation. Thus, the breadth and scope of the invention should not be limited by the above-described embodiment, but should instead be defined only in accordance with the following claims and their equivalents.

The invention claimed is:

1. A motorless reactor comprising:
a base member;
a tubular container defining a longitudinal axis extending between an upper end and a lower end, the lower end of the tubular container being coupled to the base member;
an inlet and an outlet disposed proximate the upper end of the tubular container, wherein the inlet is configured to receive a pressurized flow of water from a reservoir or an aquarium and the outlet is configured to output a mixture of water and a predetermined substance;
a pipe coupled to the inlet and extending substantially parallel to the longitudinal axis from a first end proximate the upper end of the tubular container toward a second end proximate the base member; and
a head member coupled to an end of the pipe proximate the base member and configured to direct the pressurized flow of water toward the base member and thereby mix the water and predetermined substance disposed proximate the base member.

2. The motorless reactor of claim 1, wherein the base member defines an internal surface, wherein the surface is substantially conical or frustoconical.

3. The motorless reactor of claim 1, wherein the head member comprises a pivotable inverted sprinkler head operable to rotate due to the pressurized flow of water through the pipe.

4. The motorless reactor of claim 1, wherein the head member comprises at least one radially-extending fluid conducting arm including an L-shaped outlet portion configured to generate a circular flow.

5. The motorless reactor of claim 4, wherein the head member comprises at least two of the radially-extending fluid conducting arms.

6. The motorless reactor of claim 5, wherein the head member comprises an axial outlet portion directed along the longitudinal axis toward a bottom surface of the base member.

7. The motorless reactor of claim 5, wherein the head member comprises at least two additional radially-extending fluid conducting arms each including a radially-directed outlet opening.

8. The motorless reactor of claim 7, wherein the head member comprises an axial outlet portion directed along the longitudinal axis toward a bottom surface of the base member.

9. The motorless reactor of claim 1, further comprising a check valve disposed in a fluid line between a pump in the reservoir or aquarium and the inlet.

10. The motorless reactor of claim 1, wherein the head member is pivotable.

11. The motorless reactor of claim 1, wherein the head member is non-pivotable.

12. The motorless reactor of claim 1, wherein the reservoir comprises a freshwater reservoir.

13. The motorless reactor of claim 1, further comprising a top member removably coupled to the upper end of the tubular container, wherein the inlet and the outlet are disposed on the top member.

14. The motorless reactor of claim 13, further comprising:
a cap member removably coupled to the top member, wherein removal of the cap member provides access to the interior of the tubular container for adding the predetermined substance.

15. The motorless reactor of claim 1, further comprising:
a drain mechanism disposed in a line between the reservoir or the aquarium and the inlet.

16. The motorless reactor of claim 1, wherein the outlet is configured to output to the aquarium or to an aquarium sump the mixture of water and the predetermined substance.

17. The motorless reactor of claim 1, wherein the outlet is configured to output to a second reactor the mixture of water and the predetermined substance.

18. The motorless reactor of claim 1, wherein the predetermined substance is selected from the group consisting of calcium hydroxide, sodium hydroxide, an acid, a base, a buffer, a culture of microalgae, and combinations thereof.

19. The motorless reactor of claim 1, further comprising:
a light source configured to illuminate the mixture of water and the predetermined substance in the tubular container.

20. The motorless reactor of claim 19, wherein the tubular container comprises a clear plastic or glass material.

* * * * *